US011198402B2

United States Patent
Guigner et al.

(10) Patent No.: US 11,198,402 B2
(45) Date of Patent: Dec. 14, 2021

(54) LOFTY THERMOSET FELT FOR NOISE ATTENUATION

(71) Applicant: Autoneum Management AG, Winterthur (CH)

(72) Inventors: Delphine Guigner, Winterthur (CH); Vipul Savaliya, Ontario (CA); Gregory Winiger, Winterthur (CH); Laura Gottardo, Kybury (CH)

(73) Assignee: Autoneum Management AG, Winterthur (CH)

( * ) Notice: Subject to any disclaimer, the term of this patent is extended or adjusted under 35 U.S.C. 154(b) by 520 days.

(21) Appl. No.: 16/073,729

(22) PCT Filed: Jan. 19, 2017

(86) PCT No.: PCT/EP2017/051094
§ 371 (c)(1),
(2) Date: Jul. 27, 2018

(87) PCT Pub. No.: WO2017/129468
PCT Pub. Date: Aug. 3, 2017

(65) Prior Publication Data
US 2019/0009737 A1 Jan. 10, 2019

(30) Foreign Application Priority Data
Jan. 27, 2016 (EP) .................................... 16153004

(51) Int. Cl.
*B60R 13/08* (2006.01)
*G10K 11/162* (2006.01)

(52) U.S. Cl.
CPC ........ *B60R 13/0838* (2013.01); *G10K 11/162* (2013.01)

(58) Field of Classification Search
CPC .......................... B60R 13/0838; G10K 11/162
See application file for complete search history.

(56) References Cited

U.S. PATENT DOCUMENTS 4,946,738 A * 8/1990 Chenoweth .............. D04H 1/60
428/109
5,082,720 A * 1/1992 Hayes ...................... D04H 1/54
442/362

(Continued)

FOREIGN PATENT DOCUMENTS

| CN | 101189380 A | 5/2008 |
| CN | 202242167 U | 5/2012 |

(Continued)

OTHER PUBLICATIONS

ISR, dated Jun. 7, 2017.
Office Action from related CN108602473 and machine translation thereof, dated Sep. 25, 2020. 9 pages.

(Continued)

*Primary Examiner* — Jeremy A Luks
(74) *Attorney, Agent, or Firm* — FisherBroyles, LLP; Craig W. Mueller

(57) ABSTRACT

Sound absorbing liner for the engine bay of a vehicle comprising at least one fibrous layer consisting of fibers and a thermoset binder thermally moulded to form the liner characterised in that the fibers comprises thermoplastic side by side bicomponent fibers and wherein the sides differ such that the fiber has a frizzy or curved shape.

18 Claims, 1 Drawing Sheet

(56) References Cited

U.S. PATENT DOCUMENTS

Figure 1:
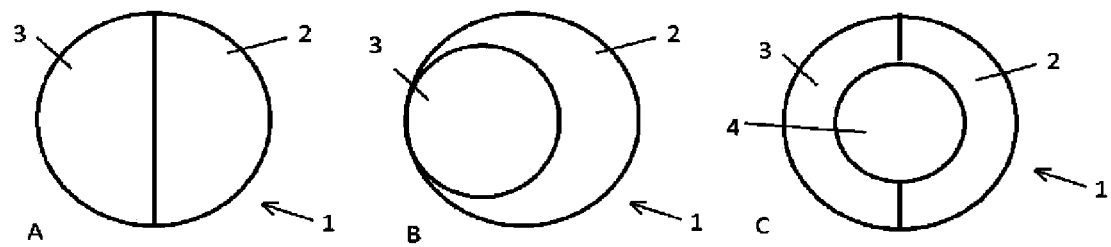

| | | | |
|---|---|---|---|
| 5,456,982 A * | 10/1995 | Hansen | D01F 8/06 |
| | | | 428/370 |
| 5,741,390 A | 4/1998 | Schmuck et al. | |
| 5,968,645 A | 10/1999 | Caccini et al. | |
| 7,918,313 B2 * | 4/2011 | Gross | D04H 1/541 |
| | | | 181/294 |
| 8,652,288 B2 * | 2/2014 | Blinkhorn | E04B 1/84 |
| | | | 156/308.2 |
| 9,809,911 B2 | 11/2017 | Peroz | |
| 9,922,634 B2 * | 3/2018 | Thompson, Jr. | D04H 3/12 |
| 10,457,225 B2 * | 10/2019 | Guigner | G10K 11/168 |
| 2002/0160682 A1 * | 10/2002 | Zeng | B60R 13/0884 |
| | | | 442/411 |
| 2008/0001431 A1 | 1/2008 | Thompson et al. | |
| 2009/0305595 A1 | 12/2009 | Ogawa et al. | |
| 2011/0165470 A1 * | 7/2011 | Dahringer | C08L 23/04 |
| | | | 429/254 |
| 2011/0305878 A1 | 12/2011 | Gladfelter | |
| 2012/0121882 A1 * | 5/2012 | Okaya | D01D 5/34 |
| | | | 428/221 |
| 2013/0244525 A1 * | 9/2013 | Chacko | A47L 15/4209 |
| | | | 442/342 |
| 2015/0354115 A1 | 12/2015 | Kohut et al. | |
| 2018/0158444 A1 * | 6/2018 | Thompson, Jr. | D04H 1/54 |

FOREIGN PATENT DOCUMENTS

| | | |
|---|---|---|
| CN | 105051280 A | 11/2015 |
| EP | 0511157 A1 | 3/1992 |
| EP | 0818425 A1 | 1/1998 |
| EP | 2640881 A1 | 9/2013 |
| EP | 2918450 A1 | 9/2015 |
| JP | 2002-61792 A | 2/2002 |
| JP | 2002061792 A | 2/2002 |
| JP | 2008-12783 A | 1/2008 |
| JP | 2008-89620 A | 4/2008 |
| JP | 2008089620 A * | 4/2008 |
| WO | 2004080710 A2 | 9/2004 |
| WO | 2006091031 A1 | 8/2006 |
| WO | 2012156234 A1 | 11/2012 |
| WO | 2014108106 A1 | 7/2014 |

OTHER PUBLICATIONS

Office Action from related JP2018-539153 and machine translation thereof, dated Oct. 6, 2020. 6 pages.
Notice of Opposition from related EP3408141 and English translation thereof. Sep. 17, 2020. 9 pages.
Houis et al., "Fibre-Table according to P.-A. Koch, Bicomponent Fibres," Textile Technology. 2008. 5 pages.
Wallenberger et al., "Glass Fibers," ASM Handbook, vol. 21: Composites (#06781G). 2001. 9 pages.

* cited by examiner

LOFTY THERMOSET FELT FOR NOISE ATTENUATION

CROSS REFERENCE TO RELATED APPLICATIONS

This application is a national stage application under 35 U.S.C. 371 and claims the benefit of PCT Application No. PCT/EP2017/051094 having an international filing date of Jan. 19, 2017, which designated the United States, which PCT application claimed the benefit of European Patent Application No. 16153004.3, filed Jan. 27, 2016, the disclosure of each of which are incorporated herein by reference.

TECHNICAL FIELD

The present invention relates to a fibrous material for cladding, the use of such material in trim parts for preferably the engine compartment of vehicles and the production of such material.

BACKGROUND ART

Resin bonded textile felts are used since a long time as acoustic insulation materials mainly for the automotive industry. Resin bonded felts are porous fibrous materials that are made from virgin and/or reclaimed fabric fibers (mainly cotton) plus a thermoset resin, which is used as the binder. Other additives may also be present in the felt formulation such as flame retardants, processing aids, water repellents, etc.

The resinous felts can be cured and cut to form padding for instance in the engine bay area, like lining for the fire wall or small local pads in the engine bay to improve the acoustic attenuation. They might also be used to pad plastic shields such as the under engine shield or the bonnet shield.

The resinous felts can also be cured and formed in a thermal moulding process to obtain rigid or semi rigid panels that can be used as for instance engine shields or covers, outer dash panels bonnet liner panels.

To obtain increased stiffness glass fibers might be used in the fibrous compositions.

Examples of resin binder used are modified or un-modified novolac or resol phenolic resin products or epoxy resin. They can be used in the form of pastilles, powders, flakes, lumps, and solvent- or water-based liquids.

Such resin felt materials is used since a long time in the automotive industry and in the last decades there were no real changes in the fiber composition and or the materials used. However the use of such felt layers according to the state of the art runs against limitations. In particular the felt tends to collapse in its thickness during the production process, also the fibers used in particular the reclaimed fibers tend to clump together even after the carding or airlay process giving rise to an irregular felt mat as starting material for forming parts. In addition the current felt mat material is not able to follow strong changes in a contour of a mould, rounding corners of products. These products have therefore a bad fit in the car when used as acoustic lining, decreasing the noise attenuation effect. Due to the weight of the fiber material used also the maximum thickness of the mat after carding or airlaying is limited, sometimes not reaching the required thickness. Adjustment can only be achieved currently by increasing the density of the fibers and or the area weight of the mat. This would cause a weight increase of the final cladding, padding, liner or trim part.

It is therefore the object of the current invention to further optimise the resin fibrous absorbing products of the state of the art, in particular to further optimise the overall acoustic and or thermal performance of the part.

SUMMARY OF INVENTION

The objective is obtained with the acoustic liner according to claim 1. In particular by an exterior sound absorbing liner for a vehicle comprising at least one fibrous layer consisting of fibers and a thermoset binder thermally cured to form the liner and whereby the fibers comprises thermoplastic side by side bicomponent fibers and wherein the sides differ such that the fiber has a frizzy or curved shape.

Surprisingly, the use of a combination of frizzy fibers with a thermoset binder makes it possible to increase the thickness at a lower density, while maintaining acoustic performance. This enables a better filling of the space available without the need to add additional weight to the part.

The frizzy fibers are formed by thermoplastic bicomponent or conjugate side by side fibers and the sides differ such that the fibers have a frizzy or curved shape. For instance the two sides are arranged such that one side shrinks differently from the other side and thereby induces a curved shaping of the filament away from the straight line, for instance in the form of spiral, omega or helical. However in most cases the shape is not necessarily a regular structure: irregular 3-dimensionally shaped versions are having the same advantage.

The frizzy fiber is a side by side bicomponent or conjugate fiber. Preferably the conjugate material is chosen such that there is a difference in viscosity causing an inherent curling or frizzing in the fibre. However other types of conjugate fibers that show a similar effect as defined might be chosen as well.

Surprisingly adding frizzy fibers to thermoset felt lining material enhances the evenness of the material layer obtained by for instance carding methods or more preferred air laying methods. The natural tendency of the frizzy fibers to go back to a random curled form gives the fibers an additional resilience. For instance loosened up material is not clumping again during processing and is better spread throughout the layer.

Surprisingly the material as claimed can be thermoformed more precisely in a 3-D shape and in addition the resilience of the material is not substantially reduced during curing or moulding, showing that the fibers are less prone to deterioration during the curing or moulding process of the actual part. Furthermore the material fiber mat keeps its resilience during use, therefore the initial thickness obtained directly after moulding is maintained longer.

Preferably, the frizzy bicomponent or conjugate fibers are made of one or a combination of:
  polyamide (nylon) preferably polyamide 6 or polyamide 6,6, in short PA;
  polyester and or its copolymers, for instance polyethylene terephthalate in short PET; polybutylene terephthalate, in short PBT, or
  polyolefin, for instance polypropylene (PP), or polyethylene (PE)
  or a combination of a polymer and its copolymer as mentioned, for instance a combination of polyethylene terephthalate and co-polyethylene terephthalate (PET/CoPET).

The use of polyesters is most preferred as they have a good record of recycling. The polymers used can be virgin or coming from recycled resources, as long as the material requirements are fullfilled.

Preferably the frizzy fibres have an overall round cross section, more preferably with a hollow core, also known as hollow conjugate fibers. However, other cross-sections known in the art to make conjugate frizzy fibers can be used as well.

Preferably the frizzy fibers are hollow.

The staple fibre length of frizzy fibers used is preferably between 32 and 76 mm. The fiber is preferably between 2 and 20 dtex, more preferably between 2 and 10 dtex.

The 2 sides, components or polymers, should be distributed in the filament string such that a difference in shrinkage is given. The maximum shrink difference between the two sides may be developed when the fibers are comprised of equal parts of each component and the components were separated and located on opposite sides of the fiber in cross section.

Preferably the fibres of the fibrous layer further comprise at least one of reclaimed fibers, mineral fibers, natural fibers or thermoplastic fibers.

Reclaimed fibers are produced from textile fabrics, preferably shoddy cotton, shoddy synthetic, shoddy polyester or shoddy natural fibers. Whereby the shoddy type is defined by having at least 51% by weight of the material included, 49% can be fibers from other sources. So for instance, shoddy polyester contains at least 51% by weight of polyester based materials. Alternatively, the shoddy material can be a mixture of different synthetic and natural fibers, whereby not one type is prevailing.

Mineral fibers can be for instance glass fibers or recycled glass fibers, basalt fibers or carbon fibers.

Thermoplastic fibers used are preferably monocomponent fibers. The fibers can be at least one the following materials polyamide (nylon) preferably polyamide 6 or polyamide 6-6, polyester and or its copolymers, preferably polyethylene terephthalate or polybutylene terephthalate, or polyolefin, preferably polypropylene or polyethylene, or a mixture of at least two of those.

The fibers in the fibrous layer can for instance be a combination of (the % given is weight % of the total weight of fibers):
1. 80% cotton shoddy and 20% frizzy fibers whereby the % is weight % of the total weight of fibers.
2. 60% cotton shoddy, 20% frizzy fibers and 20% glass fibers
3. 25% cotton shoddy, 25% frizzy fibers and 50% glass fibers.

Fiber combination 1 may for instance be used for insulating pads against a wall or around an appliance to be covered. Curing may be enough to hold the material together without a need for stiffening. Fiber combinations 2 and 3 have increased glass fiber content and may be used in areas where a stiffer panel or trim part is required for instance around the battery box or as engine cover or cladding.

More in general a fiber combination for the fibrous layer may be from 0 up to 80% by weight of reclaimed or manmade fibers, up to 40% by weight of frizzy fibers and between 0 and 60% by weight of glass fibers.

For the thermoset binder a novolak or resol type phenolic resin or an epoxy resin may be used. Preferably up to 40% of resin, based on the total weight of the fibrous liner may be used, preferably at least 10%, preferably between 20 to 30%. The example fiber combinations were bound with 30% by weight of the total fibrous layer and gave good results after curing or curing and forming of the part.

The fibrous mat preferably has an area weight of between 200 and 2000 $g/m^3$, preferably between 400 and 1000 $g/m^3$ depending on the product to be produced.

The at least one thermoset fibrous layer may be compressed locally different to form areas with different properties. They may differ in at least one of: stiffness, density, air flow resistance, or a combination of these properties, to further optimise the absorbing properties of the lining.

In a preferred embodiment the trim part is to be placed in a car to cover a vehicle panel to reduce noise.

A part produced might have essentially constant area weight, however locally a variable density. This can be achieved preferably by compressing the thermoset fibrous layer during the moulding of the trim part to form the required shape, resulting in a product that is overall air permeable and functions as an acoustic absorbing lining that is light weight and keeps its structure during the lifetime of the product.

Alternatively the fibrous mat can have an essentially constant density and a variable area weight. For instance when the fibrous mat is made on an injection fiber machine like for instance disclosed in EP 2640881 where the fiber mixture including the binder is fed in a cavity in the form of the product, the fiber density is kept constant throughout the filling process giving rise to a fibrous mat shape that contains the thickness variations necessary with a variable area weight and an essentially constant density. This preformed mat can either be cured directly on the machine as disclosed in the patent referenced or can be cured directly afterwards by feeding the form to a moulding device with the same cavity and curing the felt inside the mould.

The fibrous mat comprising the frizzy fibers and a thermoset binder can be a carded or air laid mat can be cured and cut to form a padding or lining.

Alternatively the carded or air laid fibrous mat can be, optionally precured and, cut and moulded to form a trim part or panel.

Additional layers can be added as deemed necessary. For instance at least one of a thermoplastic or glass nonwoven scrim layer, a film layer, preferably thermoplastic or metal, for instance aluminium, or a plastic carrier layer.

The thermoplastic material for the scrim layer, the thermoplastic film layer or the plastic carrier, might be the polymer or copolymer of polyester, like PET, PBT, or a polyolefin, like polypropylene or polyethylene, Polyamide, for instance polyamide 6 or polyamide 66.

The thermoset fibrous mat with the frizzy fibers can also be combined with a foam layer, preferably a polyurethane open cell foam layer, to further enhance the acoustic properties.

An automotive trim part, cladding or panel comprising at least a moulded and cured thermoset felt layer comprising frizzy fibers in the form of conjugate or bicomponent side by side fibers with a difference between the sides such that the shape of the fiber is curled or frizzy.

A lining made of cured thermoset felt according to the invention might be used as a padding or cladding directly cut to size, for instance as a padding layer in a bonnet liner. As a firewall or outer-dash lining, as a lining for an under engine shield or other car body mounted part. In most of these cases the part serves as a noise absorber. Surprisingly the absorption of the parts produced was similar, however at a lower weight compared to parts without the frizzy fibers.

The use of the cured thermoset felt with frizzy fibers in combination with at least an additional layer particularly a foam layer, a heavy barrier layer, a foil layer or a second felt layer to form an engine cover or engine cladding with enhanced acoustic performance.

Other uses of trim parts might be battery covers and or side panels to form a thermal insulation, preferably glass fibers are included in the thermoset felt fiber blend, or front fender insulators, where the thermoset felt with the frizzy fibers forms an insulating and sealing layer. In this case the better fit of the material after moulding will enhance the sealing function of the part.

The Production of the Trim Part

In the following examples of production processes will be explained in more detail. However, a skilled person might also be expected to know how to use alternative processes to come to a similar result.

The different fibres are blended in the advantageous combination according to the teachings of the invention and the properties needed for the specific part, such that the fibers are evenly blended throughout the material formed. The blended fibres are formed in a mat or batt, by known technologies available on the market. Preferably by using a card or garnet, which gives a more orientated fibre material or by using an air-lay process, for instance using a Rando-Webber or other known air lay machine, which gives a more random laid web or mat, a fibrous mat is formed.

The thus obtained mat can be further cured in a continuous process. The mat can be either cured and cut in the final padding or lining or precured to form blanks. The precuring is such that the binding is just enough to transport and store the blanks for later processing, but not enough that the binder resin cannot be activated again.

The blanks can be hot moulded to form a trim part, cladding or panel. For instance by placing the thermoset felt blank containing the frizzy fibers in a mould, optionally including additional layers like for instance covering layers in the form of a nonwoven scrim, and or further stiffening layers in the form for instance of a glass veil, closing the mould and thermally curing the fibrous felt layer and laminating all layers together. Optionally also locally instead of a glass veil over the whole surface, unidirectional glass tapes and the thermoplastic fibrous felt may be placed preferably abut to increase locally or overall the bending stiffness of the part.

Alternatively the blanks can be preheated in a hot air oven followed by a cold moulding step to obtain the 3 D shaped trim part. Alternatively the material is heated directly in the mould for instance by a hot fluid, like hot air or steam, to obtain a consolidated part.

An exemplary manufacturing process for resin bonded felts can be described as follows:
  The textile material is shredded to give fibres ca. 1-6 cm in length.
  The fibres are deposited onto a conveyer via one of a number of orientation processes that give the correct distribution of fibres in the final felt mat.
  The powder resin and additives are distributed throughout the loose fiber mat, the resin being added at a level of ca. 20-70 parts per 100 parts of textile fiber.
  The resin containing felt mat is then moved into a hot air, or steam oven or both, where the binder within the material first softens and then is cured in order to mechanically bond the fibres within the felt mat together.

For non-shaped felt mats the oven temperature is typically in the range 160-200° C. and the material is fully cured when it emerges from the oven. The finished material emerging from the oven is cooled prior to cutting and packing. The pressurized steam can be used of preferably between 6-12 bar to reach an equivalent temperature range.

For shaped (pressed) products, the oven temperature may be lower and/or the residence time will be shorter as the felt mat is only partially cured in the oven. The material becomes fully cured only after the final pressing operation. This pressing operation is carried out in heated moulds at 170-190° C. and can also involve the application of a decorative surface to the shaped article. After pressing, the felt articles are cooled prior to trimming/packing.

Alternatively the shaped products can be made in a mould using direct pressurised steam process. Whereby the felt mat is placed in a mould, the mould closed and steam injected in the mould to heat and cure the binder and thereby setting the shaped product.

The figures explain the invention in further detail and have to be seen as examples with feature that can be freely combined with those already disclosed and explained.

FIG. 1 Schematic cross section of bicomponent fibers.

Figure 2:
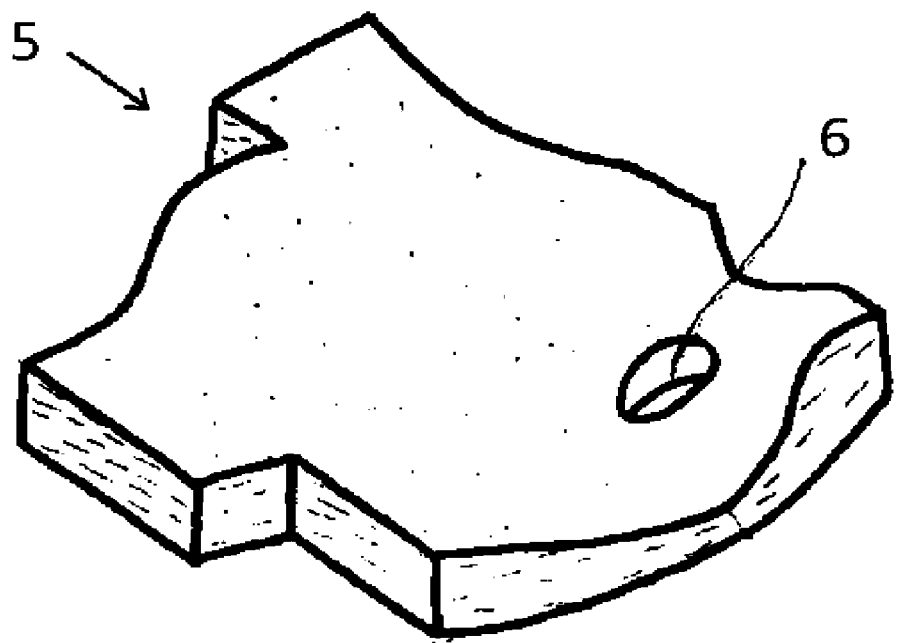

FIG. 2 shows an example of a cladding with the thermoset felt material according to the invention.

FIG. 1 shows cross sections of bicomponent or conjugate side by side fibers according to the invention. The fibers are produced from 2 thermoplastic polymers with a difference in the polymers such that the fiber will curl during the fiber production process forming frizzy fibers. The side (2) by side (3) can be symmetrical organised as shown in figure A or can be asymmetrical as shown in figure B. In addition the fibers might be hollow (4) as shown for the side by side fiber cross section of figure C as an example.

FIG. 2 shows a padding or lining made of cured thermoset felt according to the invention. In this example the felt material has a variable thickness and area weight but a constant density. The hole (6) can be either cut later or integrated in the mould used. Due to the combination of a thermoset fibrous felt material including the frizzy fibers it is possible to make complex but defined shapes for padding or lining of a car. With complex shapes is meant large step changes in the thickness of the material, for instance to fill a deeper area in a panel, sudden changes of between 5 and 10 mm might occur with the requirement of a straight change and not a curved gradual change. The fit of the part will be enhanced and therefore the acoustic performance of the part increased. Furthermore it is now possible to obtain the same shape of part with less weight in comparison to a fiber combination without the frizzy fibers. As the material is loftier, the absorption of noise is increased. For example for the same part it was possible to decrease the weight 20% without losing on thickness or performance by including the frizzy fibers in the fibrous layer.

The invention claimed is:

1. A sound absorbing liner for a vehicle comprising:
  at least one fibrous layer consisting of fibers and a thermoset binder thermally moulded to form the liner;
  wherein the fibers comprise thermoplastic bicomponent fibers having a first side and a second side; and
  wherein the first side and second side differ such that the fibers have a naturally frizzy or curved shape.

2. The sound absorbing liner according to claim 1, wherein the fibers further comprise recycled fibers.

3. The sound absorbing liner according to claim 2, wherein the recycled fibers are one of a cotton shoddy, a synthetic shoddy, a polyester shoddy, a natural fiber shoddy, or a mixed synthetic fiber and natural fiber shoddy.

4. The sound absorbing liner of claim 2, whereby the fibers further comprise mineral fibers.

5. The sound absorbing liner of claim 4, whereby the fibers further compise at least one of polyester fibers, polyamide fibers, polyolefin fibers, or a combination of a polymer and the polymer's copolymer.

6. The sound absorbing liner according to claim 2, whereby the fibers further compise at least one of polyester fibers, polyamide fibers, polyolefin fibers, or a combination of a polymer and the polymer's copolymer.

7. The sound absorbing liner according to claim 1, whereby the fibers further comprise mineral fibers.

8. The sound absorbing liner according to claim 7, whereby the fibers further compise at least one of polyester fibers, polyamide fibers, polyolefin fibers, or a combination of a polymer and the polymer's copolymer.

9. The sound absorbing liner according to claim 1, whereby the fibers further comprise at least one of polyester fibers, polyamide fibers, polyolefin fibers, or a combination of a polymer and the polymer's copolymer.

10. The sound absorbing liner according to claim 1, whereby the bicomponent fibers are made of at least one of polyamide 6, polyamide 6-6, polyester, polybutylene terephthalate, polyolefin, polypropylene, polyethylene, or polyethylene terephthalate.

11. The sound absorbing liner according to claim 1, whereby the thermoset binder is epoxy resin or phenolic resin.

12. The sound absorbing liner according to claim 1, whereby the fibrous layer consist of between 0 to 80% by weight of reclaimed or manmade fibers, between 10-40% by weight of frizzy fibers, and between 0 and 60% by weight of glass fibers.

13. The sound absorbing liner of claim 1, wherein the liner is configured as an acoustic and/or thermal padding or a liner for a sound aborbing trim part in the engine bay area of a vehicle.

14. The sound absorbing liner of claim 13, wherein the liner is thermally moulded to form a 3-dimensional shaped part.

15. The sound absorbing liner of claim 14, further comprising at least an additional layer selected from the group consisting of a foam layer, a felt layer, a scrim layer, a nonwoven layer, barrier layer, a perforated, film layer, a perforated, metal layer, a rigid carrier, and glass veil layer.

16. The sound absorbing liner of claim 13, further comprising at least an additional layer selected from the group consisting of a foam layer, a felt layer, a scrim layer, a nonwoven layer, barrier layer, a perforated, film layer, a perforated, metal layer, a rigid carrier, and glass veil layer.

17. A method of using the sound absorbing liner according to claim 1 as a sound absorbing liner, a trim part, an engine cover, a hood liner or trim part, an under engine shield, an outer dash, a battery cover or a battery cladding.

18. The sound absorbing liner according to claim 1, wherein the first side is a first polymer and the second side is a second polymer that is different from the first polymer, and wherein the fibers curl naturally during a fiber production process.

* * * * *